United States Patent [19]

Beck et al.

[11] 3,928,373

[45] Dec. 23, 1975

[54] 1,2,3-TRIAZOLES

[75] Inventors: Gerhard Beck, Frankfurt am Main; Dieter Günther, Kelkheim, Taunus, both of Germany

[73] Assignee: Hoechst Aktiengesellschaft, Frankfurt am Main, Germany

[22] Filed: Mar. 15, 1973

[21] Appl. No.: 341,799

Related U.S. Application Data

[63] Continuation-in-part of Ser. No. 257,761, May 30, 1972, abandoned.

[30] Foreign Application Priority Data

Aug. 2, 1971 Germany............................ 2138522

[52] U.S. Cl............ 260/307 D; 8/1 W; 117/33.5 R; 117/33.5 T; 252/300; 252/301.2 W; 260/78 S; 260/240 CA; 260/240 D; 260/240 E; 260/240 TC; 260/296 R; 260/308 A; 424/59
[51] Int. Cl.².......................................... C07D 249/04
[58] Field of Search..... 260/240 D, 240 CA, 307 D, 260/308 A, 240 E, 296 R, 240 TC

[56] References Cited

UNITED STATES PATENTS

| 3,470,196 | 9/1969 | Harvey............................ 260/308 A |
| 3,686,202 | 8/1972 | Kirchmayr et al.............. 260/308 A |

FOREIGN PATENTS OR APPLICATIONS

| 784,124 | 11/1972 | Belgium............................. 260/308 |

OTHER PUBLICATIONS

Zefirov et al., Zhur. Org. Khim. Vol. 6, pp. 2596 to 2600, (1970), (English translated version provided, pp. 2605–2608).

*Primary Examiner*—John D. Randolph
*Attorney, Agent, or Firm*—Connolly and Hutz

[57] ABSTRACT

1,2,3-Triazoles are obtained by reacting an alkenyl sulfine with a salt of hydrazoic acid. The products are fluorescent agents and useful as UV-absorbers, scintillators or optical brighteners or starting materials for such materials.

5 Claims, No Drawings

1,2,3-TRIAZOLES

This is a continuation-in-part of our copending application Ser. No. 257,761, filed May 30, 1972, now abandoned.

The present invention relates to 1,2,3-triazoles and to a process for preparing them.

It is already known to prepare 4-cyano-1,2,3-triazole by reacting fumaric acid dinitrile with sodium azide in dimethylsulfoxide. It is also known to synthetize 4-cyano-5-phenyl-1,2,3-triazole by reacting benzylidenemalonic acid dinitrile with sodium azide (cf. Zh. Org. Khim. 6 (1970) 12, page 2596).

It has now been found that compounds of the general formula I

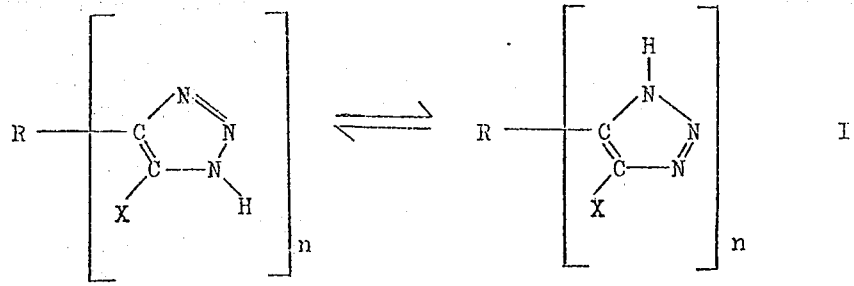

in which $n$ is 1 or 2, R stands for hydrogen, a mono- or divalent organic radical or a direct bond, R is — if $n$ is 1 — lower alkyl; lower alkenyl; cycloalkyl, cycloalkenyl or cycloalkdienyl of 4 to 6 carbon atoms each; phenyl; phenyl substituted by 1 to 3 radicals selected from the group consisting of lower alkyl, hydroxy, amino, lower-alkyl-amino, di-(lower alkyl)-amino, lower alkanoylamino, halogen, lower alkoxy, nitro, carboxy, lower carboalkoxy and cyano; naphthyl; anthracenyl, pyrenyl 1-amino-anthraquinolyl; benzyl; phenethyl; styryl; furanyl; tetrahydrofuranyl, thienyl, pyridyl or benzoxazolyl and — if $n$ is 2 — R is a direct bond, lower alkylene, lower alkenylene, phenylene, —C$_6$H$_4$—(lower alkylene), 4,4'-stilbylene or 1,4'-styrylene, X is a pyrone group of the formula

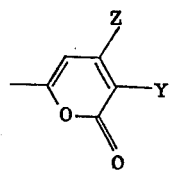

in which Y is hydrogen or chlorine and Z is hydrogen or lower alkyl or X and Y together stand for an annellated benzene ring; a group of the formula

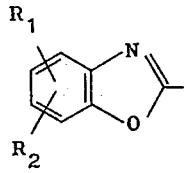

in which $R_1$ is hydrogen, lower alkyl, halogen, amino, lower alkanoylamino, nitro or lower carboalkoxy, $R_2$ is hydrogen, halogen or lower alkyl or $R_1$ and $R_2$ together stand for an annellated benzene ring; a group of the formula

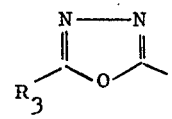

in which $R_3$ is lower alkyl or a group selected from phenyl, benzyl or styryl, the aromatic nuclei of which are unsubstituted or substituted by halogen, lower alkyl or lower alkoxy; or a group of the formula R''—CO—, in which R'' is lower alkyl, lower alkoxy, amino, lower-alkyl-amino, di-(lower alkyl)-amino, phenyl or phenoxy; or R'' together with R form a pyrone or benzopyrone ring, can be obtained by reacting a compound of formula II

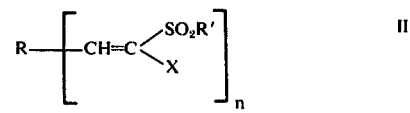

in which R, X and $n$ are defined as above and R' stands for alkyl having 1 to 4 carbon atoms or phenyl which may be substituted, preferably by up to two radicals selected from lower alkanoylamino, nitro or lower alkoxy, with $n$ to ($n + 0.5$) mols of a salt of hydrazoic acid at a temperature of about 0° to about 200°C.

By the term "lower" there are to be understood hereinbefore and hereinafter straight-chain or branched hydrocarbon radicals having up to 5 carbon atoms in the chain.

Owing to the tautomeric motility of the hydrogen atom linked to one of the nitrogen atoms, the nitrogen atoms 1 and 3 and hence the carbon atoms 4 and 5 are equivalent. The carbon atom that carries the group X is said to be located hereinafter, at random, in 4-position.

1,2,3-Triazoles which have no substituent in 5-position or carry phenyl in 5-position and lower alkanoyl or carbalkoxy or carbamoyl in 4-position are already known (cf. A. N. Nesmeyanov and M. I. Rybinskaya, Dokl. Akad. Nauk SSSR 158 (1964), page 408; Chem. Abstr. 61 (1964) 14 664 h). The compounds of the formula I, in which R stands for a direct bond or a mono- or divalent aliphatic, cycloaliphatic, araliphatic, heterocyclic or substituted aromatic radical and $n$ for the integer 1 or 2, are novel compounds.

The compounds of the formula II used as starting material may be obtained according to methods known in the literature, for example from the corresponding aldehydes by a reaction with the corresponding sulfonyl derivatives (cf. Tröger et al., J. prakt. Chem. 71 (1905), p. 225; 78 (1908), p. 123; 106 (1913), p. 173 and Arch. pharm. 247 (1909), p. 613). Since almost all aldehydes undergo this reaction, the type of possible radicals R is practically unlimited.

This radical R may carry one or several substituents, preferably one, two or three substituents, such as halogen, especially fluorine, chlorine or bromine, nitro, amino or mono- or dialkylamino, cyano or alkyl, alkoxy or alkenyl having up to 4 carbon atoms.

As radical R, there are preferably used alkyl radicals having 1 to 4 carbon atoms, i.e. methyl, ethyl, propyl or butyl; as alkenyl radicals, allyl, 2,3- and 3,4-butenyl; as cycloalkyl or cyclo-alkenyl radicals, cyclobutyl, cyclobutenyl, cyclopentyl, cyclopentenyl, cyclopentadienyl, cyclohexyl, cyclohexenyl and the various cyclohexadienyl groups; as aryl radicals, 2-nitrophenyl, 3-nitrophenyl, 4-nitrophenyl, 2,4-dinitrophenyl, 3-aminophenyl, 4-aminophenyl, 4-acetaminophenyl, 3-dimethylaminophenyl, 3-hydroxy-phenyl, 4-hydroxyphenyl, the various methyl-, ethyl-, propyl-phenyl radicals, the corresponding dialkyl and trialkyl phenyl radicals, 4-methoxyphenyl, 3,4,5-trimethoxyphenyl, 4-cyanophenyl, 4-chlorophenyl, 3-bromophenyl and other mono-, di- or trihalogenophenyl radicals, in which halogen preferably is fluorine, chlorine or bromine; naphthyl or 1-amino-anthraquinoyl; as aralkyl or aralkenyl radicals, benzyl, styryl and the homologues thereof, in which the phenyl radical which may carry the above-indicated substituents is linked to the group $>C=CH-$ in the formula II via an alkylene or alkenylene radical. As heterocyclic radicals, there may be mentioned, among a great variety of groups, furanyl, tetrahydrofuranyl, thiophenyl or pyridyl.

If $n$ stands for the integer 2, R necessarily stands for a direct bond or a divalent organic radical. Compounds of the formula I, in which R stands for a divalent organic radical, are obtained from divalent, preferably aromatic, aldehydes or the functional derivatives thereof.

Preferred divalent organic radicals are lower alkylene radicals, such as ethylene, alkenylene radicals, such as $-CH=CH-$, aralkylene and aralkenylene radicals, such as $-C_6H_4-CH_2-$, $-C_6H_4-CH_2-CH_2-$ and $-C_6H_4-CH=CH-$, and in particular the phenylene radical.

As far as the end product is concerned, the radical R' in the formula II is not critical, since it does not appear in the end product. Seen from the viewpoint of reaction mechanism, it is only important inasfar as it is not to render difficult the splitting-off of the sulfonyl radical as a sulfinate anion $R'-SO_2^-$.

As radicals R' in the formula II, there are preferred methyl- and phenyl radicals, but other alkyl or substituted phenyl radicals may also be used, instead, such as ethyl, propyl, m-nitrophenyl or 3-nitro-4-methoxyphenyl, since the sulfinate split off in the formation of the compounds of the formula I can be recovered by known methods and again be used for the preparation of the corresponding sulfonyl derivatives of the formula II.

As radicals X of the formula $-CO-R''$, there are preferably used lower alkanoyl groups, such as $-COCH_3$, $-COC_2H_5$, $-COC_3H_7$, $-COC_4H_9$, or lower alkyl ester groups, such as $-COOCH_3$, $-COOC_2H_5$, $-COOC_3H_7$, $-COOC_4H_9$, furthermore the corresponding amides, such as $-CONH_2$, $-CONHCH_3$, $-CON(CH_3)_2$, $-CONHC_2H_5$, $-CON(C_2H_5)_2$, $-CONHC_3H_7$ or $-CON(C_4H_9)_2$, wherein, in the radicals X, lower alkyl may also be replaced by phenyl or substituted phenyl. Moreover, X may preferably represent the pyrone ring, especially α-pyrones, which carry, in 3-position, halogen, especially chlorine, and in 4-position, lower alkyl, especially methyl. If R and X (or R'') form a ring, X may also stand for the cumarine grouping.

As radicals X, there are especially preferred benzoxazole, 6-methylbenzoxazole, 6-ethyl-benzoxazole, 5-methyl-benzoxazole, 5-butylbenzoxazole, 4,6-dimethyl-benzoxazole, 5,6-dimethyl-benzoxazole, 5,6-diethyl-benzoxazole, 5-carbomethoxy-benzoxazole, 5-carbothoxybenzoxazole, naphthoxazole, 5-nitro-benzoxazole, 6-nitrobenzoxazole, 6-aminobenzoxazole, 5-amino-benzoxazole, 5,7-dichloro-benzoxazole, 5-acetamino-benzoxazole, 6-acetaminobenzoxazole, 5-chloro-6-nitrobenzoxazole, 5-chloro-7-nitro-benzoxazole, 7-chloro-5-methylbenzoxazole, 5-methyl-1,3,4-oxdiazole, 5-ethyl-1,3,4-oxdiazole, 5-butyl-1,3,4-oxdiazole, 5-styryl-1,3,4-oxdiazole, 5-benzyl-1,3,4-oxdiazole, 5-phenyl-1,3,4-oxdiazole, 5-(3'-chlorophenyl)-1,3,4-oxdiazole, 5-(3',4'-dichlorophenyl)-1,3,4-oxdiazole, 5-(3'-methoxyphenyl)-1,3,4-oxdiazole, 5-(4'-ethoxyphenyl)-1,3,4-oxdiazole, 5-(4'-butoxyphenyl)-1,3,4-oxdiazole, 5-(2'methyl-phenyl)-1,3,4-oxdiazole, 5-(4'-butyl-phenyl)-1,3,4-oxdiazole.

As salts of the hydrazoic acid, there are preferably used salts with monovalent cations, especially the alkali metal salts and the ammonium salt.

The process of the invention for the preparation of the compounds of the formula I may be illustrated by the following reaction scheme:

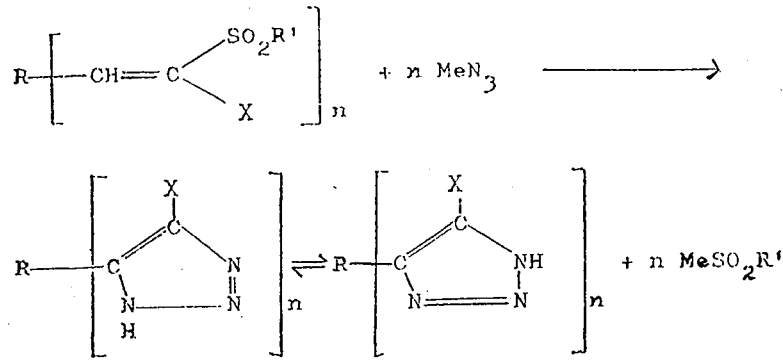

in which Me stands for the monovalent cation.

The reaction may be carried out by mixing the components in a preferably stoichiometrical ratio, preferably in a solvent or diluent. However, in order to obtain better yields, in some cases, it may be advantageous to use the salt of the hydrazoic acid in a slight excess amount, i.e. in an about up to 1.5-fold excess. If R stands for a divalent radical or the direct bond, about 2 mols, resp. 2 to 2.5 mols, of azide have to be used accordingly.

The reaction temperature is between about 0° and about 200°C, preferably between 50° and 150°C.

As solvents or diluents, there are preferably employed polar solvents, such as dioxan, tetrahydrofuran, diisopropyl ether, alcohols, such as methanol, ethanol, butanol; moreover, nitromethane, nitrobenzene, acetone, or nitriles, such as acetonitrile, propionitrile; furthermore, dimethylsulfoxide or amides, such as N-methyl-pyrrolidone; especially dimethylformamide and dimethylacetamide.

The reaction products obtained according to the invention are generally precipitated in the form of crystals, where required after concentration, and can be isolated by suction-filtration.

The compounds of formula I are fluorescent agents and, thus, useful as UV-absorbers, scintillators or optical brighteners and the like. As the skilled artisan knows, the selection for these purposes depends on the absorption and emission range, e.g. a compound absorbing in the range of about 290 to 320 nm is a valuable UV-absorber for creams preventing sunburns while compounds absorbing in the range of about 350 to 370 nm and emitting in the range of 400 to 450, especially 430 to 440 nm, i.e. in the visual range, are optical brighteners. Compounds having an emission range below the visual range can be transformed into brighteners by linking these compounds to a radical fluorescing in the desired range, e.g. by reacting a compound containing a carboxylic acid group or a reactive derivative thereof with an ortho-amino-phenol to yield a compound containing a benzoxazole group (cf. e.g. U.S. Pat. No. 3,336,330 as to this condensation process).

Likewise, the compounds of formula I are intermediates for dyestuffs, especially fluorescent dyestuffs, and can be linked in known manner with their reactive groups to known dyestuffs.

EXAMPLE 1

11.5 g (27 mmoles) of the compound of the formula

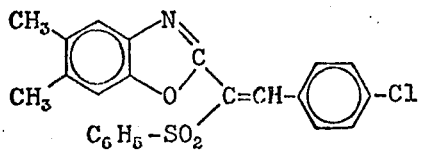

(melting point 201° – 203° C) were heated for 2 hours, while stirring, to 100° C, with 2 g (30 mmoles) of sodium azide in 100 ml of dimethylformamide. The reaction mixture was filtered while hot, the solvent was removed by distillation under reduced pressure and the residue was stirred with 20 ml of water. After acidification with 2N-hydrochloric acid, the reaction product was filtered off with suction, washed with water until neutrality, dried and recrystallized from a mixture of methanol and dimethylformamide.

5.5 g (61 % of the theory) of 4-(5',6'-dimethylbenzoxazole-2'-yl)-5-(4''-chlorophenyl)-1,2,3-triazole melting at 253° – 254° C were obtained.

$C_{17}H_{13}ClN_4O$ (324.8), fluorescence maximum in dimethylformamide 382 nm. Calculated: C, 62,86 %; H, 4,03 %; N, 17,25 %; Cl, 10,92 %. Found: C, 62,8 %; H, 4,3 %; N, 16,8 %; Cl, 10,5 %.

EXAMPLE 2

8.9 g (20 mmoles) of the compound of the formula

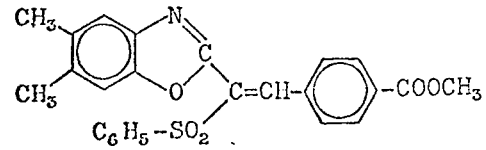

(melting point 178° – 180° C) were heated for 2 hours, while stirring, to 80° C, with 1.5 g (22 mmoles) of sodium azide in 50 ml of dimethylformamide. The reaction solution was filtered while still hot, the solvent was removed by distillation under reduced pressure and the residue was stirred with 200 ml of water. The reaction product was filtered off with suction, washed, dried and recrystallized from a mixture of methanol and dimethylformamide 6.7 g (96 % of the theory) of 4-(5',6'-dimethylbenzoxazole-2'-yl)-5-(4''-carbomethoxyphenyl)-1,2,3-triazole melting at 247° – 248° C were obtained.

$C_{19}H_{16}N_4O_5$ (348.4), fluorescence maximum in dimethylformamide: 427 nm. Calculated: C, 65,50 %; H, 4,63 %; N, 16,08 %. Found: C, 65,3 %; H, 4,8 %; N, 16,1 %.

EXAMPLE 3

16 g (37 mmoles) of the compound of the formula

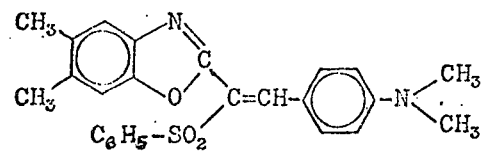

(melting point 221° – 222° C) were heated for 3 hours, while stirring, to 100° C with 2.6 g of sodium azide in 100 ml of dimethylsulfoxide. The reaction solution was filtered while still hot, the solvent was removed by distillation under a water jet vacuum and the residue was stirred with 200 ml of water. The reaction product was filtered off with suction, washed, dried and recrystallized from ethanol.

10 g (81 % of the theory) of 4-(5',6'-dimethylbenzoxazole-2'-yl)-5-(4''-dimethylaminophenyl)-1,2,3-triazole melting at 199° – 200° C were obtained.

$C_{19}H_{19}N_5O$ (333.4), fluorescence maximum in dimethylformamide: 465 nm.

EXAMPLE 4

10 g (23 mmoles) of the compound of the formula

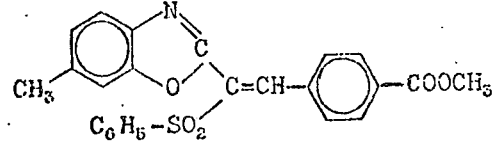

(melting point 139° – 140° C) were heated for 2 hours, while stirring, to 80° C with 1.6 g (25 mmoles) of sodium azide in 50 ml of dimethylformamide. The solvent was removed by distillation under a water jet vacuum and the residue was stirred with 200 ml of water. The reaction product was filtered off with suction, washed and dried.

7.7 g (100 % of the theory) of 4-(6'-methylbenzoxazole-2'-yl)-5-(4''-carbomethoxyphenyl)-1,2,3-triazole melting at 208° – 211° C were obtained.

$C_{18}H_{14}N_4O_3$ (334.3), fluorescence maximum in dimethylformamide: 415 nm.

EXAMPLE 5

7.4 g (16.4 mmoles) of the compound of the formula

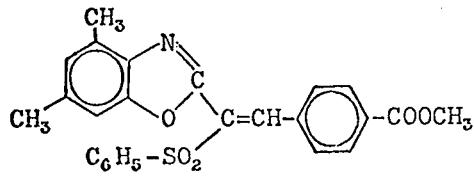

(melting point 114° – 115° C) were heated for 2 hours, while stirring, to 80° C with 1.2 g (18 mmoles) of sodium azide in 50 ml of dimethylformamide. After working up as described in Example 4, 5.9 g (100 % of the theory) of 4-(4',6'-dimethyl-benzoxazole-2'-yl)-5-(4''-carbomethoxyphenyl)-1,2,3-triazole melting at 134° – 135° C were obtained.

$C_{19}H_{16}N_4O_3$ (348.4), fluorescence maximum in dimethylformamide: 412 nm.

EXAMPLE 6

9 g (20 mmoles) of the compound of the formula

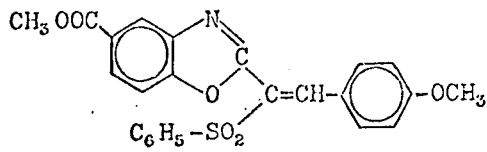

(melting point 114° – 116° C) were heated for 2 hours, while stirring, to 80° C with 1.4 g (22 mmoles) of sodium azide in 50 ml of dimethyl sulfoxide. After having worked up as described in Example 4, there were obtained, after recrystallization from ethanol 6.6 g (93 % of the theory) of 4-(5'-carbomethoxybenzoxazole-2'-yl)-5-(4''-methoxyphenyl)-1,2,3-triazole melting at 186° – 188° C.

$C_{18}H_{14}N_4O_4$ (350.3), fluorescence maximum in dimethylformamide: 408 nm.

EXAMPLE 7

7 g (15 mmoles) of the compound of the formula

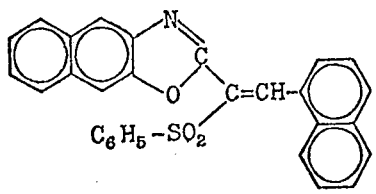

(melting point 169° C) were heated for 2 hours, while stirring, to 80° C with 1.1 g (17 mmoles) of sodium azide in 50 ml of dimethyl sulfoxide. After having worked up as described in Example 4, there were obtained 5.4 g (100 % of the theory) of 4-naphthoxazole-2'-yl-(1''-naphthyl)-1,2,3-triazole melting at 277° – 278° C (from ethanol).

$C_{23}H_{14}N_4O$ (362.4), fluorescence maximum in dimethylformamide: 420 nm.

EXAMPLE 8

8.3 g (20 mmoles) of the compound of the formula

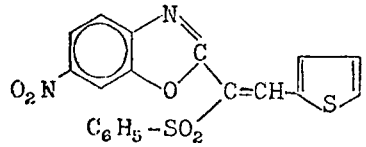

(melting point 211° – 212° C) were heated for 2 hours, while stirring, to 80° C with 1.4 g (22 mmoles) of sodium azide in 50 ml of dimethylformamide. After having worked up as described in Example 4, there were obtained 6 g (96 % of the theory) of 4-(6'-nitrobenzoxazole-2'-yl)-5-thiophene-2''-yl-1,2,3-triazole melting at 281° – 283° C recrystallized from (ethanol).

EXAMPLE 9

14.3 g (31 mmoles) of the compound of the formula

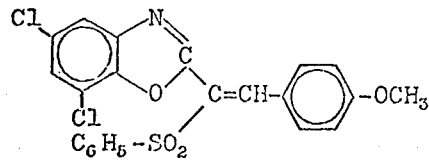

(melting point 149° – 151° C) were heated for 1 hour, while stirring, to 80° C, with 2.2 g (34 mmoles) of sodium azide in 100 ml of dimethylformamide. After having worked up as described in Example 4, there were obtained 9.8 g (87 % of the theory) of 4-(5',7'-dichlorobenzoxazole-2'-yl)-5-(4''-methoxyphenyl)-1,2,3-triazole melting at 199° – 200° C.

$C_{16}H_{10}Cl_2N_4O_2$ (361.2), fluorescence maximum in dimethylformamide: 408 nm. Calculated: C, 53,20 %; H, 2,79 %; Cl, 19,63 %; N, 15,51 %. Found: C, 53,2 %; H, 3,2 %; Cl, 19,4 %; N, 15,5 %.

EXAMPLE 10

35.4 g (75 mmoles) of the compound of the formula

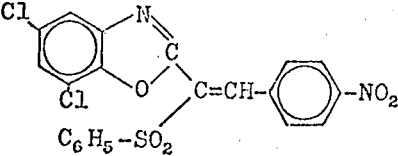

(melting point 178° – 180° C) were heated for 2 hours, while stirring, to 80° C with 5.4 g (82 mmoles) of sodium azide in 150 ml of dimethylformamide. After having worked up as described in Example 4, there were obtained 26.6 g (94 % of the theory) of 4-(5',7'-dichloro-benzoxazole-2'-yl)-5-(4''-nitrophenyl)-1,2,3-triazole melting at 258° C (decomposition).

EXAMPLE 11

10.2 g (24 mmoles) of the compound of the formula

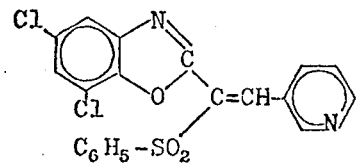

(melting point 139° – 141° C) were heated for 2 hours, while stirring, to 80° C with 11.7 g (26 mmoles) of sodium azide in 50 ml of dimethylformamide. After having worked up as described in Example 4, there were obtained 6.5 g (75 % of the theory) of 4-(5′,7′-dichlorobenzoxazole-2′-yl)-5-pyridine-3″-yl-1,2,3-triazole melting at >300° C.

$C_{14}H_7Cl_2N_5O$ (332.2), fluorescence maximum in dimethylformamide: 392 nm.
Calculated: C, 50.61 %; H, 2.13 %; Cl, 21.35 %; N, 21.09 %. Found: C, 50.8 %; H, 2.2 %; Cl, 21.4 %; N, 20.8 %.

EXAMPLE 12

11.5 g (25.5 mmoles) of the compound of the formula

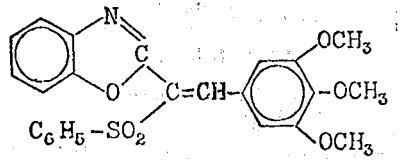

(melting point 149° – 150° C) were heated for 2 hours to 80° C with 1.8 g (28 mmoles) of sodium azide in 100 ml of dimethylformamide. After having worked up as described in Example 4, there were obtained 8.1 g (90% of the theory) of 4-benzoxazole-2′-yl-5-(3″,4″,5″-trimethoxyphenyl)-1,2,3-triazole melting at 174° – 176° C (ethanol).

$C_{18}H_{16}N_4O_4$ (352.4), fluorescence maximum in dimethylformamide: 409 nm.

EXAMPLE 13

13.3 g (29 mmoles) of the compound of the formula

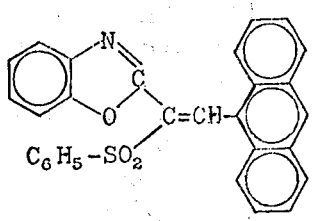

(melting point 188° – 189° C) were stirred for 2 hours at 80° C with 2.1 g (32 mmoles) of sodium azide in 80 ml of dimethyl sulfoxide. After having worked up as described in Example 4, there were obtained 8 g (70% of the theory) of 4-benzoxazole-2′-yl-5-anthracene-9″-yl-1,2,3-triazole melting at 280° – 282° C (decomposition).

$C_{23}H_{14}N_4O$ (362,4). Fluorescence maximum in dimethylformamide. 435 nm.

EXAMPLE 14

2.5 g (3.9 mmoles) of the compound of the formula

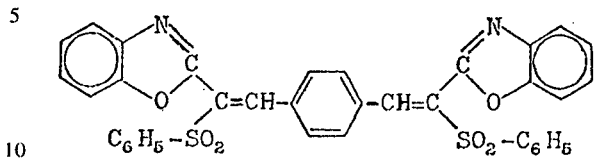

(melting point 289° – 290° C) were stirred for 2 hours at 80° C with 0.55 g (8.5 mmoles) of sodium azide in 30 ml of dimethyl sulfoxide. After working up as described in Example 4, there were obtained 1.6 g (91 % of the theory) of a compound of the formula

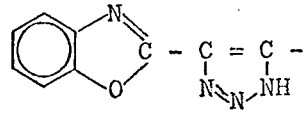

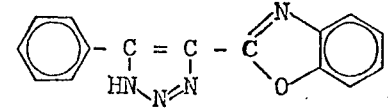

melting at 330° C.

$C_{24}H_{14}N_8O_2$ (446.4), fluorescence maximum in dimethylformamide: 421 nm.

EXAMPLE 15

38.7 g (89 mmoles) of the compound of the formula

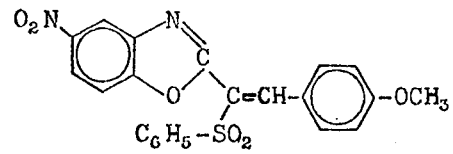

(melting point 165° – 166° C) were heated for 3 hours, while stirring, to 80° C, with 6.4 g (98 mmoles) of sodium azide in 100 ml of dimethylformamide. The solvent was removed under a water jet vacuum and the residue was poured on 200 g of ice. The reaction product was filtered off with suction and recrystallized from methanol. 24.5 g (82.% of the theory) of 4-(5′-nitrobenzoxazole-2′-yl)-5-(4″-methoxyphenyl)-1,2,3-triazole melting at 276° – 280° C were obtained.

$C_{16}H_{11}N_5O_4$ (337) Calculated: C, 57.0 %; H, 3.3 %; N, 20.8 %. Found: C, 56.9 %; H, 3.4 %; N, 20.2 %. Fluorescence maximum of the amino compound prepared by reduction with hydrogen/Raney nickel in dimethyl formamide: 418 nm.

EXAMPLE 16

45.2 g (0.1 mole) of the compound of the formula

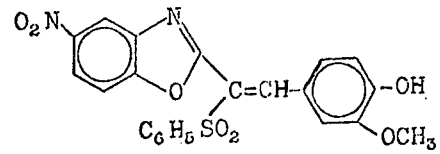

(melting point 225° – 227° C) were heated for 3 hours to 90° C with 6.5 g (0.1 mole) of sodium azide in 130 ml of dimethylformamide. The solvent was removed and the residue was poured on 200 g of ice. The crystals that had precipitated were filtered off with suction and recrystallized from 600 ml of butanol. 33.3 g (94 % of the theory) of 4-(5′-nitro-benzoxazole-2′-yl)-5-(3″-methoxy-4″-hydroxyphenyl)-1,2,3-triazole melting at 255° – 257° C were obtained.

$C_{16}H_{11}N_5O_5$ (353) Calculated C, 54.3 %; H, 3.1 %; N, 19.8 %. Found: C, 54.2 %; H, 3.2 %; N, 19.0 %. Fluorescence maximum of the amino compound prepared by reduction with hydrogen/Raney nickel in dimethylformamide: 468 nm.

EXAMPLE 17

55 g (0.13 mole) of the compound of the formula

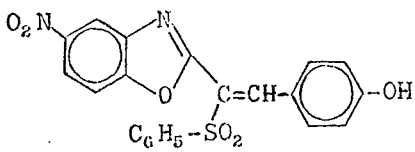

(melting point 228° – 232° C) were heated for 3 hours to 90° C with 8.8 g (0.135 mole) of sodium azide in 130 ml of dimethylformamide. The reaction mixture was then poured into 500 ml of water, filtered with suction and washed with water. The reaction product was then boiled for 1 hour in 400 ml of methanol, again suction-filtered and dried. 40.1 g (95 % of the theory) of 4-(5′-nitrobenzoxazole-2′-yl)-5(4″-hydroxyphenyl)-1,2,3-triazole . 3/2 methanol melting at 265° – 267° C were obtained.

$C_{15}H_{11}N_5O_2$ . 3/2 $CH_3OH$ (371.3) Calculated: C, 53.5 %; H, 4.1 %; N, 18.8 %. Found: C, 53.4 %; H, 3.6 %; N, 18.9 %. Fluorescence maximum of the amino-compound prepared with hydrogen/Raney nickel in dimethylformamide: 465 nm.

EXAMPLE 18

100 g (0.237 mole) of the compound of the formula

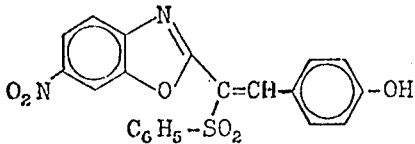

(melting point 240° – 242° C) were stirred for 3 hours at 85° C with 15.6 g (0.24 mole) of sodium azide in 250 ml of dimethylformamide. The reaction mixture was allowed to cool to room temperature and then introduced into 2 liters of water. The reaction product was filtered off with suction and the wet press cake was stirred with 1 liter of methanol for 1 hour, again filtered with suction and dried. 65.1 g (85 % of the theory) of 4-(6′-nitro-benzoxazole- 2′-yl)-5-(4″-hydroxyphenyl)-1,2,3-triazole . 2 methanol melting at 250°– 252° – 252° C were obtained.

$C_{15}H_{19}N_5O_4$ . 2 $Ch_3OH$ (387.4)
Calculated: C, 52.8 %; H, 4.5 %; N, 18.1 %.
Found C, 52.5 %; H, 4.4 %; N, 18.1 %.

Fluorescence maximum of the amino compound prepared by reduction with hydrogen/Ramey nickel in dimethylformamide: 415 nm.

EXAMPLE 19

107.3 g (0.246 mole) of the compound of the formula

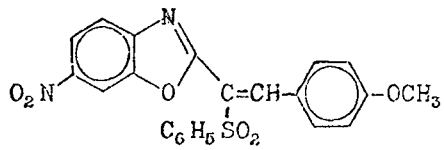

(melting point 173° – 175°C) were stirred with 16.3 g (0.25 mole) of sodium azide in 250 ml of dimethylformamide for 3 hours at 85°C. The reaction mixture was then poured on 2 liters of a mixture of ice and water and the reaction product was filtered off with suction. The wet press cake was boiled for 1 hours under reflux with 2 liters of isopropanol, suction-filtered again and dried. 66.5 g (85 % of the theory) of 4-(6′-nitro-benzoxazole-2′-yl)-5-(4″-methoxyphenyl)-1,2,3-triazole melting at 255° –257° C were obtained.

$C_{16}H_{11}N_5$ $O_4$ (337)
Calculated: C, 57.0%; H, 3.3 %; N, 20.8 %.
Found: C, 56.9 %; H, 3.4 %; N, 20.0 %.

Fluorescence maximum of the amino compound prepared by reduction with hydrogen/Raney nickel in the dimethylformamide: 427 nm.

EXAMPLE 20

4.9 g (10 mmoles) of the compound of the formula

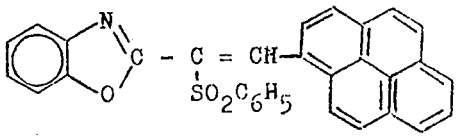

(melting point 191° – 192° C) were heated for 3 hours, while stirring to 80° C with 0.75 g (11 mmoles) of sodium azide. After working up as described in Example 3, 3.8 g (98 % of the theory) of 4-(benzoxazole-2′-yl)-5-(pyrene-3″-yl)-1,2,3-triazole melting at 254° – 255° C were obtained.

$C_{25}$ $H_{14}N_4O$ (386.4), fluorescence maximum in dimethylformamide: 437 nm.

EXAMPLE 21

2 g (2.5 mmoles) of the compound of the formula

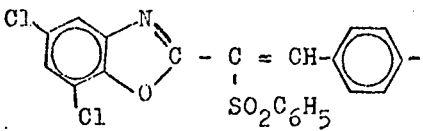

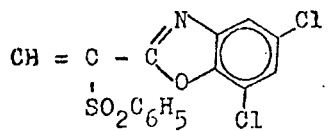

(melting point 244° – 245°C) were heated for 2 hours, while stirring, to 80° C, with 0.4 g (5.5 mmoles) of sodium azid in 50 ml of dimethylformamide. After having worked up as described in Example 3, there were obtained, after recrystallization from 16 ml of dimethylformamide, 1.2 g (82% of the theory) of a compound of the formula

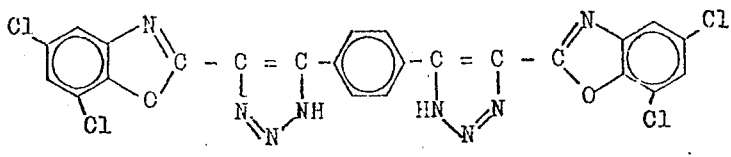

melting at >300° C.

$C_{24}H_{10}Cl_4N_8O_2$ (584.2), fluorescence maximum in dimethylformamide: 440 nm.

In analogous manner, there was prepared the compound of the formula

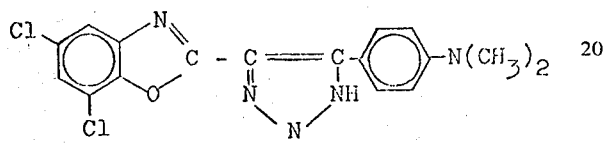

melting point: 237° C; yield: 85 % of the theory.

EXAMPLE 22

12.3 g (29.3 mmoles) of the compound of the formula

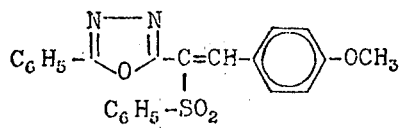

(melting point 152° – 154° C) were heated, while stirring, for 90 minutes to 80°C, with 2.1 g (32 moles) of sodium azide in 100 ml dimethylformamide. The reaction mixture was filtered while still hot, the solvent was removed by distillation under a water jet vacuum and the residue was stirred with 200 ml of water. The reaction product was filtered off with suction, washed, dried and recrystallized from ethanol. 8 g (85 % of the theory) of 4-(5'-phenyl-1',3', 4'-oxdiazole-2'-yl)-5-(4''-methoxyphenyl)-1,2,3-triazole melting at 135° – 136° C were obtained.

$C_{17}H_{13}N_5O_2$ (319.3), fluorescence maximum in dimethylformamide: 400 nm.

EXAMPLE 23

15.0 g (35 mmoles) of the compound of the formula

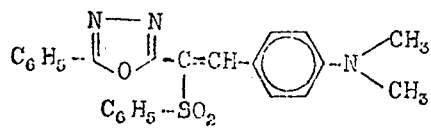

(melting point 194° – 196° C) were heated for 2 hours, while stirring, to 100° C with 2.5 g (39 mmoles) of sodium azide in 100 ml of dimethylformamide. After having worked up as described in Example 22, there were obtained 9 g (77 % of the theory) of 4-(5'-phenyl-1',3',4'-oxdiazole-2'-yl)-5-(4''-dimethylaminophenyl)-1,2,3-triazole melting at 212° – 216° C.

$C_{18}H_{16}N_6O$ (332.4), fluorescence maximum in dimethylformamide: 520 nm.

EXAMPLE 24

7 g (14.5 mmoles) of the compound of the formula

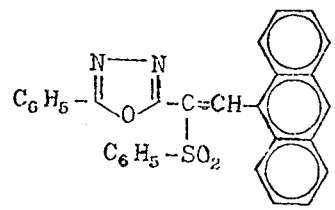

(melting point 179° – 180° C) were heated for 4 hours, while stirring, to 80° C with 1 g (15 mmoles) of sodium azide in 80 ml of dimethylsulfoxide. After having worked up as described in Example 22, there were obtained 4 g(72 % of the theory) of 4-(5'-phenyl-1',3',-4'-oxdiazole-2'-yl)-5-anthracene-9''-yl-1,2,3-triazole melting at 244° – 245° C.

$C_{24}H_{15}N_5O$ (389.4), fluorescence maximum in dimethylformamide: 405 nm.

EXAMPLE 25

3.5 g (5 mmoles) of the compound of the formula

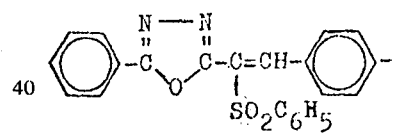

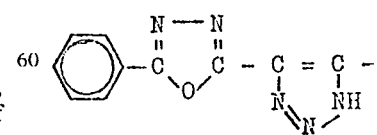

(melting point 206° C) were heated for 2 hours, while stirring, to 80° C with 0.75 g (11 mmoles) of sodium azide in 50 ml of dimethylformamide. After having worked up as described in Example 22, there were obtained, after recrystallization from 35 ml of dimethylformamide, 2 g (80% of the theory) of the compound of the formula

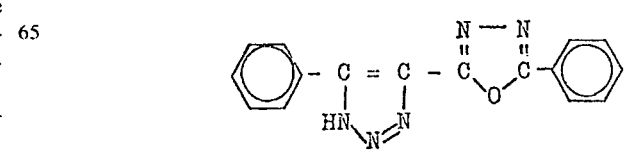

melting at >300° C.

$C_{26}H_{16}N_{10}O_2$ (500.5), fluorescence maximum in dimethylformamide: 440 nm.

EXAMPLE 26

13 g (2.5 mmoles) of the compound of the formula

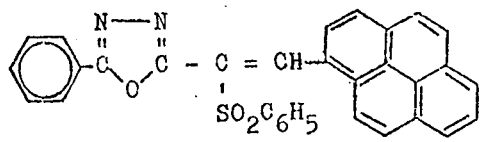

(melting point 204°–205° C) were heated for 2 hours, while stirring, to 80° C with 2 g (30 mmoles) of sodium azide in 100 ml of dimethylformamide. After having worked up as described in Example 22, there were obtained 10 g (98 % of the theory) of 4-(5'-phenyl-1',-3',-4'-oxdiazole-2'-yl)-5-(pyrene-3''-yl)-1,2,3-triazole melting at 170°C.

$C_{26}H_{15}N_5O$ (413.4), fluorescence maximum in dimethylformamide: 427 nm.

The compound of the formula

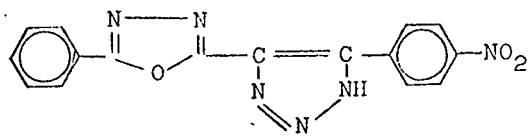

(melting point 282°C) can be prepared in analogous manner in a yield of 93 %.

EXAMPLE 27

2.55 Grams (5mmoles) of the compound of the formula

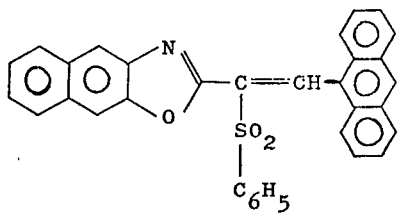

(melting point 181°–185°C) were dissolved in 15 ml of dimethyl-formamide. To this solution there were added at a temperature of 60°C while stirring 0.39 g (6 mmol) of sodium azide. The mixture was heated for 3 hours to 100°C and then allowed to cool. The reaction mixture was poured into 100 ml of water, weakly acidified with 2N-hydrochloric acid and the precipitated triazole was filtered off with suction. After drying and recrystallization from dioxane there were obtained 1.38 g (67 % of the theory) of 4(2-naphth [2,3-d]oxazolyl)-5-(9-anthryl)-1,2,3-triazole melting at 174°C.

$C_{27}H_{16}N_4O$ (412.45) fluorescence maximum (in dimethylformamide): 338 nm

EXAMPLE 28

0.72 Grams (11 mmoles) sodium azide were added at 60°C in small portions with stirring to a solution of 4.11 g (10 mmoles) of the compound of the formula

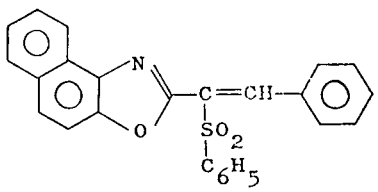

in dimethylformamide. The mixture was heated for 4 hours to 100°C and then allowed to cool. Thereafter, the reaction mixture was poured into 50 ml of 0.4 N sodium hydroxide solution, filtered and the filtrate was acidified with 15 ml of 2N hydrochloric acid. The precipitated triazole was filtered off with suction, dryed and recrystallized from isopropanol. There were obtained 2.3 g (73 % of the theory) of 4-(2-naphth[1,2-d]oxazolyl)-5-phenyl-1,23-triazole melting at 205° – 207°C.

$C_{19}H_{12}N_4O$ (312.33) fluorescence maximum (in dimethyl formamide): 395 nm

EXAMPLE

In substantially the same manner as specified in Example 30 and using the work-up method of Example 31 there were obtained the following 4-(2-naphth[1,2-d]oxazolyl)-1,2,3-triazoles of the formula

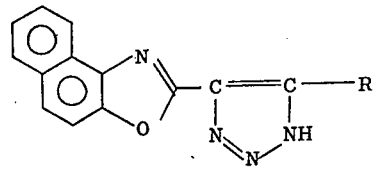

| R | vinyl-phenylsulfonyl compound melting point (°C) | triazole melting point (°C) | yield % of the theory | fluorescence maximum (nm) |
|---|---|---|---|---|
| Cl-⌬ | 147–148 | 271–273 | 84 | 394 |
| Cl,⌬ | 141–143 | 240–242 | 86 | 395 |

-continued

| R | vinyl-phenylsulfonyl compound melting point (°C) | triazole melting point (°C) | yield % of the theory | fluorescence maximum (nm) |
|---|---|---|---|---|
| 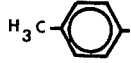 | 156–157 | 220–222 | 73 | 396 |
| 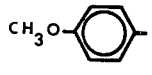 | 152–153 | 207–210 | 73 | 405 |
| 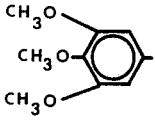 | 188–190 | 205–207 | 80 | 406 |
| 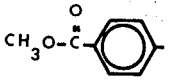 | 159–163 | 250–254 | 90 | 427 |
| 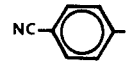 | 165–168 | 274–276 | 65 | 425 |
| 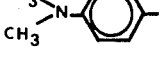 | 210–212 | 142–144 | 92 | 475 |
|  | 254–256 | 310 | 61 | 429 |
| 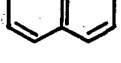 | 169–172 | 197–198 | 70 | 405 |
| 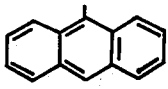 | 207–209 | 292–293 | 56 | 453 |
| 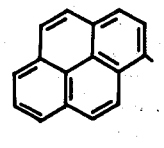 | 229–231 | 135–140 | 98 | 442 |
| 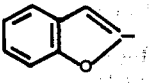 | 166–168 | 310 | 100 | 409 |

EXAMPLE 30

15.1 g (50 mmols) of 1-phenyl-sulfonyl -2-phenyl-acrylic acid methyl ester (m.p. 96°–97°C), 3.25 g (50 mmols) of sodium azide and 50 ml of dimethylformamide were heated while stirring to 100°C for 3 hours. The mixture was filtered hot, the solvent was distilled off in vacuo and the residue was stirred with 200 ml of water. The reaction product was suction-filtered, washed with water, dried and recrystallized from benzene.

5.2 g (51% of the theoretical yield) of 4-carbomethoxy-5-phenyl-1,2,3-triazole were obtained, m.p. 105°–106°C.

Analysis: $C_{10}H_9N_3O_2$. Molecular weight: 203.2.
Calculated: C, 59.10%; H, 4.46%; N, 20.68%.
Found: C, 58.5%; H, 4.5%; N, 19.7%.

EXAMPLE 31

17.3 g (50 mmols) of 1-phenylsulfonyl -2-(4-dimethylaminophenyl)-acrylic acid methyl ester (m.p. 123°–124°C) and 3.25 g (50 mmols) of sodium azide were heated while stirring in 50 ml of dimethylformamide to 100°C for 3 hours. The mixture was filtered hot, the solvent was eliminated in vacuo and the residue was stirred with 150 ml of water. The reaction product was suction-filtered, washed with water, dried and recrystallized from benzene.

7.0 g (57% f the theoretical yield) of 4-carbomethoxy-5-(4-dimethylamino-phenyl)-1,2,3-triazole were obtained, m.p. 149°–150°C.

Analysis: $C_{12}H_{14}N_4O_2$. Molecular weight: 246.26.

EXAMPLE 32

14.3 g (50 mmols) of (1-phenyl-sulfonyl -2-phenyl)-vinylmethyl-ketone (m.p. 90°–92°C) were reacted in a manner analogous to Example 1. 6.0 g (64% of the theoretical yield) of 4-acetyl-5-phenyl-1,2,3-triazole were obtained, m.p. 112°–113°C.

Analysis: $C_{10}H_9N_3O$. Molecular weight: 187.2. Calculated: C, 64.16%; H, 4.85%; N, 22.45%. Found: C, 63.9%; H, 5.2%; N, 22.2%.

EXAMPLE 33

13.0 g (45 mmols) of 1-phenylsulfonyl -2-phenyl-acrylic acid amide (m.p. 182°–183°C) were stirred with 3.25 g (50 mmols) of sodium azide in 30 ml of dimethylformamide at 100°C for 2 hours, the mixture was then filtered hot and the solvent was eliminated in vacuo. The residue was combined with 100 ml of water, the crystals which had precipitated were suction-filtered, washed with water and dried in vacuo.

7.5 g (88% of the theoretical yield) of 4-carbamoyl-5-phenyl-1,2,3-triazole were obtained, m.p. 278°–279°C (from dimethylformamide/water).

Analysis: $C_9H_8N_4O$. Molecular weight: 188.2. Calculated: C, 57.44%; H, 4.29%; N, 29.77%. Found: C, 57.5%; H, 4.7%; N, 29.4%.

EXAMPLE 34

21.0 g (59 mmols) of 1-phenylsulfonyl -2-(3,4-dichloro-phenyl)-acrylic acid amide (m.P. 155°–156°C) were reacted with 3.9 g (60 mmols) of sodium azide in a manner analogous to Example 4

11.0 g (72.5% of the theoretical yield) of 4-carbamoyl-5-(3,4-dichlorophenyl)-1,2,3-triazole were obtained, m.p. 254°–255°C.

Analysis: $C_9H_6Cl_2N_4O$. Calculated: C, 42.0%; H, 2.3%; Cl, 27.5%; N, 21.8%. Found: C, 42.5%; H, 2.5%; Cl, 27.1%; N, 21.4%.

EXAMPLE 35

28.0 g (64 mmols) of 1-phenylsulfonyl -2-(3-methoxy-4-hydroxy-phenyl)-acrylic acid amide (m.p. 110°–112°C) and 4.3 g (65 mmols) of sodium azide were heated while stirring in 50 ml of anhydrous dimethylformamide to 100°C for 2 hours. The mixture was then filtered hot, the solvent was eliminated in vacuo and the residue was poured on 300 ml of ice/water. The crystals which had precipitated were suction-filtered, recrystallized from isopropanol and dried.

9.5 g (63% of the theoretical yield) of 4-carbamoyl-5-(3-methoxy-4-hydroxyphenyl)-1,2,3-triazole were obtained, m.p. 258°–259°C.

Analysis: $C_{10}H_{10}N_4O_3$. Molecular weight: 234.2. Calculated: C, 51.2%; H, 4.3%; N, 23.9%. Found: C, 50.7%; H, 4.4%; N, 23.6%.

EXAMPLE 36

16.5 g (50 mmols) of 1-phenylsulfonyl -2-(4-dimethylaminophenyl)-acrylic acid amide (m.p. 252°–253°C) were reacted with 3.25 g (50 mmols) of sodium azide in a manner analogous to Example 6.

11.0 g (94% of the theoretical yield) of 4-carbamoyl-5-(4-dimethylamino-phenyl)-1,2,3-triazole were obtained, m.p. 265°–266°C.

Analysis: $C_{11}H_{13}N_5O$. Molecular weight: 231.3. Calculated: C, 57.3%; H, 5.6%. Found: C, 57.3%; H, 5.8%.

EXAMPLE 37

18.05 g (50 mmols) of 3-(3-nitro-4-methoxy-phenylsulfonyl)-cumarine (m.p. 271°–272°C) were stirred with 3.25 g (50 mmols) of sodium azide in 50 ml of dimethylformamide at 100°C for 3 hours. The mixture was then filtered hot, the solvent was eliminated in vacuo, the residue was poured into 150 ml of ice/water, the precipitate was suction-filtered, dried in vacuo and recrystallized from 100 ml of isopropanol.

3.0 g (34% of the theoretical yield) of 3-H-triazolo-[4,5-c] [1]-benzopyran-4-one were obtained, m.p. 270°–272°C.

Analysis: $C_9H_5N_3O_2$. Molecular weight: 187.1.

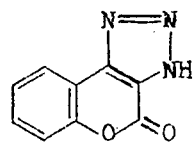

Calculated: C, 57.76%; H, 2.69%; N, 22.45%. Found: C, 57.4%; H, 2.9%; N, 21.8%.

EXAMPLE 38

32.9 g (0.1 mol) of 1-(4-acetamino-phenylsulfonyl)-2-phenyl-acrylic acid amide (m.p. 236°–238°C), 6.5 g (0.1 mol) of sodium azide and 80 ml of anhydrous dimethylformamide were stirred for 2 hours at 105°C. The mixture was then filtered, introduced into 200 ml of ice/water and the crystallized reaction product was suction-filtered, washed with water and dried in vacuo.

13.0 g (69% of the theoretical yield) of 4-carbamoyl-5-phenyl-1,2,3-triazole were obtained, m.p. 278°C.

Analysis: $C_9H_8N_4O$. Molecular weight: 188.2.

EXAMPLE 39

16 g (0.044 mol) of 4-methyl-6-(1′-phenylsulfonyl -2′-p-methoxyphenyl)-vinyl-pyrone-(2) (m.p. 142°–145°) and 3.1 g (0.048 mol) of sodium azide were stirred for 2 hours at 100°C. The mixture was then filtered, the solvent was distilled off, water was added to the residue and the mixture was acidified with 2N hydrochloric acid. The crystallized product was suction-filtered, washed to neutral and dried. After recrystallization from 80 ml of ethanol, 8 g (64% of the theoretical yield) of a yellowish powder were obtained, which had a melting point of 183° – 184°C and the formula

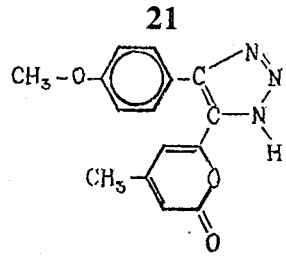

Analysis: $C_{15}H_{13}N_3O_3$. Molecular weight: 283.3.

EXAMPLE 40

7.1 g (0.0165 mol) of 4-methyl-6-[1'-phenylsulfonyl -2'-(3,4,5-trimethoxyphenyl)]-vinyl-α-pyrone were reacted with 1.2 g (0.0185 mol) of sodium azide in a manner analogous to Example 10. After recrystallization from acetonitrile, 4.1 g (74% of the theoretical yield) of a compound having a melting point of 235°–237°C and the formula

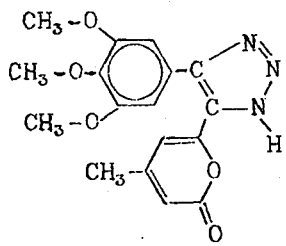

were obtained.

Analysis: $C_{17}H_{17}N_3O_5$. Molecular weight: 343.3.
Calculated: C, 59.47%; H, 4.99%; N, 12.24%.
Found: C, 59.5%; H, 4.9%; N, 12.5%.

EXAMPLE 41

A cotton fabric was treated at a goods to liquor ratio of 1:30 with a bath which contained 0.3 g/l of the compound specified in Example 14 in the form of the sodium salt. The temperature was raised slowly to 95° C. After a treatment time of 60 minutes, the fabric was well rinsed and dried. The fabric showed a distinct increase of the degree of whiteness as compared to that of unwashed material.

EXAMPLE 42

An unbleached fabric of polyamide was treated at a goods to liquor ratio of 1:30 with a bath which contained 0.2 g/l of the compound of the formula

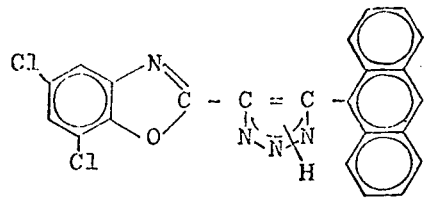

in dispersed form. The temperature of the bath was raised slowly to 95° C. After 60 minutes, the fabric was washed thoroughly and dried. The material so treated showed a whiter aspect than untreated material.

EXAMPLE 43

A polyamide fabric was treated at a goods to liquor ratio of 1:20 with a bath which contained 0.3 g/l of the compound of the formula

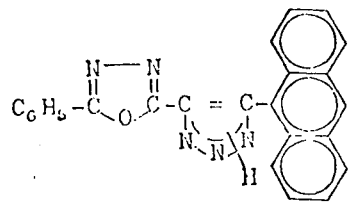

in dispersed form. The temperature of the bath was raised slowly to 95° C. After 60 minutes, the fabric was washed and dried. The material so treated had an excellent degree of whiteness.

EXAMPLE 44

A polyamide-6 fabric was treated at a goods to liquor ratio of 1:30 with a bath which contained 0.2 g/l of the triazole specified in Example 20 in dispersed form. The temperature of the bath was slowly raised to 95° C. After 60 minutes the fabric was washed thoroughly and dried. The material so treated showed a distinctly better degree of whiteness compared to that of untreated material.

We claim:
1. A compound of the formula

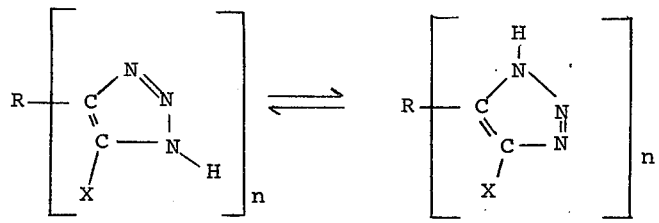

in which $n$ is 1 or 2, R is — if $n$ is 1 — lower alkyl; lower alkenyl; cycloalkyl, cycloalkenyl or cycloalkdienyl of 4 to 6 carbon atoms each; phenyl; phenyl substituted by 1 to 3 radicals selected from the group consisting of lower alkyl, hydroxy, amino, lower-alkyl-amino, di-(lower alkyl)-amino, lower alkanoylamino, halogen, lower alkoxy, nitro, carboxy, lower carboalkoxy and cyano; naphthyl; anthracenyl, pyrenyl, 1-amino-anthraquinolyl; benzyl; phenethyl; styryl; furanyl; tetrahydrofuranyl, thienyl, pyridyl or benzoxazolyl and — if $n$ is 2 — R is a direct bond, lower alkylene, lower alkenylene, phenylene, —$C_6H_4$—(lower alkylene), 4,4'-stilbylene or 1,4'-styrylene and X is a group of the formula

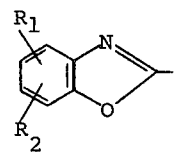

in which $R_1$ is hydrogen, lower alkyl, halogen, amino, lower alkanoylamino, nitro or lower carboalkoxy, $R_2$ is hydrogen, halogen or lower alkyl or $R_1$ and $R_2$ together stand for an annellated benzene ring.

2. A compound as claimed in claim 1, wherein X is a group of the formula

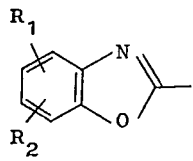

in which $R_1$ is hydrogen, methyl, chlorine, amino, acetamino, nitro or carbomethoxy, $R_2$ is hydrogen, chlorine or methyl and $R_1$ and $R_2$ together are an annellated benzene ring.

3. A compound as claimed in claim 1 in which
$n$ is 1 and
X is a group of the formula

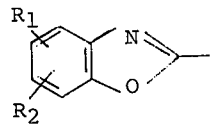

4. A compound as claimed in claim 1 in which
$n$ is 1,
R is lower carboalkoxyphenyl,
X is a group of the formula

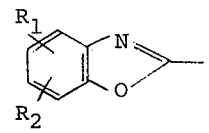

in which $R_1$ and $R_2$ each are lower alkyl.

5. The compound as claimed in claim 4 in which
R is p-carbomethoxyphenyl, and
$R_1$ and $R_2$ each are methyl in the 5 and 6 positions.

* * * * *